United States Patent
Pedersen et al.

(10) Patent No.: US 12,510,950 B2
(45) Date of Patent: Dec. 30, 2025

(54) LOW POWER STANDBY MODE FOR MEMORY DEVICES

(71) Applicant: GlobalFoundries U.S. Inc., Malta, NY (US)

(72) Inventors: Bard M. Pedersen, Fremont, CA (US); Gideon Intrater, Sunnyvale, CA (US)

(73) Assignee: GLOBALFOUNDRIES U.S. Inc., Malta, NY (US)

( * ) Notice: Subject to any disclaimer, the term of this patent is extended or adjusted under 35 U.S.C. 154(b) by 0 days.

(21) Appl. No.: 17/510,545

(22) Filed: Oct. 26, 2021

(65) Prior Publication Data

US 2023/0131586 A1 Apr. 27, 2023

(51) Int. Cl.
G06F 1/3234 (2019.01)
G06F 1/3296 (2019.01)
G11C 5/14 (2006.01)

(52) U.S. Cl.
CPC .......... *G06F 1/3275* (2013.01); *G06F 1/3296* (2013.01); *G11C 5/147* (2013.01); *G11C 5/148* (2013.01)

(58) Field of Classification Search
CPC ..... G06F 1/3275; G06F 1/3296; G11C 5/147; G11C 5/148
See application file for complete search history.

(56) References Cited

U.S. PATENT DOCUMENTS

| | | | |
|---|---|---|---|
| 9,922,684 B2 | 3/2018 | Pedersen et al. | |
| 10,409,505 B2 | 9/2019 | Lewis et al. | |
| 10,521,154 B2 | 12/2019 | Pedersen | |
| 2006/0164904 A1* | 7/2006 | Saleh | G11C 16/24 365/226 |
| 2011/0222329 A1 | 9/2011 | Tsukada | |
| 2017/0236561 A1* | 8/2017 | Pedersen | G11C 5/147 365/227 |
| 2019/0064916 A1* | 2/2019 | Jouin | G06F 1/3243 |
| 2019/0333550 A1* | 10/2019 | Fisch | G11C 5/147 |

OTHER PUBLICATIONS

David Chalupsky, Emily Qi, Ilango Ganga, "A Brief Tutorial on Power Management in Computer System" Mar. 13, 2007 (Year: 2007).*

* cited by examiner

*Primary Examiner* — Kim Huynh
(74) *Attorney, Agent, or Firm* — David Cain; Andrew M. Calderon; Calderon Safran & Wright P.C.

(57) ABSTRACT

A memory device, can include: a control circuit configured to operate the memory device in one of an active mode, a standby mode, and a sleep mode, where the memory device is configured to receive a command from a host device when in the standby mode; a voltage regulator having an output that provides a supply voltage for accessing contents of memory cells in the memory device, where the voltage regulator is off during the sleep mode and the standby mode, and the voltage regulator is on during the active mode; and a storage element configured to maintain the supply voltage to allow the voltage regulator to be turned off during the standby mode, and at least until the voltage regulator turns on in the active mode and supports the supply voltage.

20 Claims, 12 Drawing Sheets

LOW POWER STANDBY MODE FOR MEMORY DEVICES

FIELD OF THE INVENTION

The present invention generally relates to the field of semiconductor devices. More specifically, embodiments of the present invention pertain to memory devices, including both volatile and non-volatile memory devices, such as flash memory devices.

BACKGROUND

Non-volatile memory (NVM) is increasingly found in applications, such as solid-state hard drives, removable digital picture cards, automotive electronics, home appliances, and so on. Flash memory is the predominant NVM technology in use today. However, flash memory has limitations, such as a relatively high power, as well as relatively slow operation speed. Microprocessor performance can be very sensitive to memory latency. Many non-volatile memory devices have an access time or latency that is relatively slow as compared to the microprocessor. In addition, many implementations of various communication protocols between a microprocessor/host and memory, such as serial peripheral interface (SPI) can add even more latency than is required by the memory array itself.

DETAILED DESCRIPTION OF EMBODIMENTS

Figure 1:
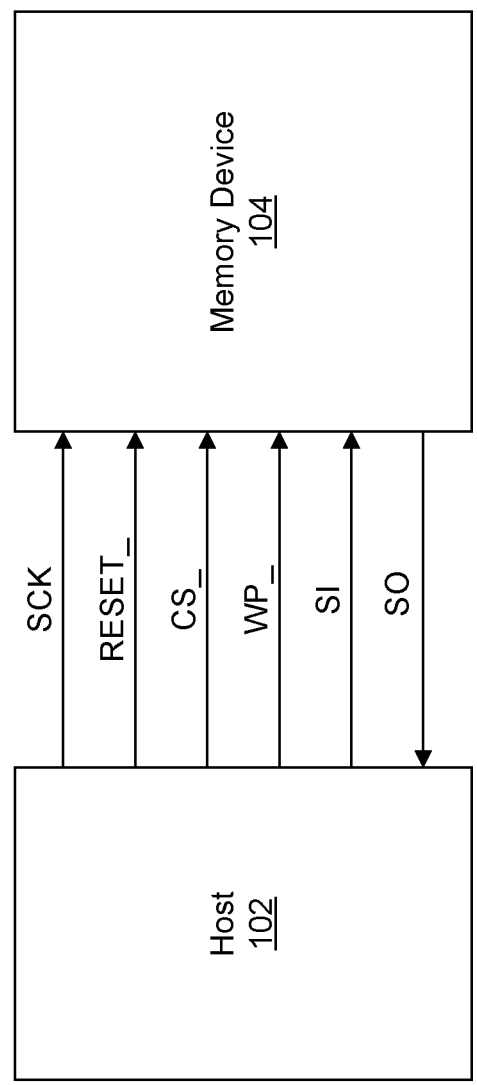
FIG. 1 is a schematic block diagram of an example host and memory device arrangement, in accordance with embodiments of the present invention.

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Particular embodiments may be directed to memory devices, including volatile memory, such as SRAM and DRAM, and including non-volatile memory (NVM), such as flash memory devices, and/or resistive switching memories (e.g., conductive bridging random-access memory [CBRAM], resistive RAM [ReRAM], etc.). Particular embodiments can include structures and methods of operating flash and/or resistive switching memories that can be written (programmed/erased) between one or more resistance and/or capacitive states. In one particular example, a CBRAM storage element may be configured such that when a forward or reverse bias greater than a threshold voltage is applied across electrodes of the CBRAM storage element, the electrical properties (e.g., resistance) of the CBRAM storage element can change. In any event, certain embodiments are suitable to any type of memory device, and in particular NVM devices, such as flash memory devices, and may include resistive switching memory devices in some cases.

Referring now to FIG. 1, shown is a schematic block diagram 100 of an example host and memory device arrangement, in accordance with embodiments of the present invention. In this example, host 102 can interface with memory device 104 via a serial interface. For example, host 102 can be any suitable controller (e.g., CPU, MCU, general-purpose processor, GPU, DSP, etc.), and memory device 404 can be any type of memory device (e.g., SRAM, DRAM, EEPROM, Flash, CBRAM, magnetic RAM, ReRAM, etc.). Memory device 104 can thus be implemented in a variety of memory technologies, such as non-volatile types. In some cases, memory device 104 can be a serial flash memory that may be implemented in more traditional types of non-volatile memories, or in CBRAM/ReRAM resistive switching memories.

Various interface signals, such as in a serial peripheral interface (SPI) interface, can be included for communication between host 102 and memory device 104. In this example Single SPI configuration/mode, serial clock (SCK) can provide a clock to device 104, and may be used to control the flow of data to and from the device. Command, address, and input data (e.g., on the SI pin) can be latched on a rising edge of SCK, while output data (e.g., on the SO pin or via I/O pins) can be clocked out on a falling edge of SCK, or by a data strobe in some arrangements. The reset pin (RESET_) can be used to terminate an operation in progress, and to reset an internal state machine of memory device 104 (e.g., to an idle state). Memory device 104 can remain in the reset condition as long as a low level is present on the reset pin. Also, because memory device 104 can include power-on reset circuitry, there may be no restrictions on the reset pin during power-on sequences. In some other implementations, memory device 104 may not include the reset pin (RESET_), and may instead include a hold pin (HOLD_).

Chip select (CS_) can be utilized to select memory device 104, such as from among a plurality of such memory devices, or otherwise as a way to access the device. When the chip select signal is de-asserted (e.g., at a high level), memory device 104 will also be deselected, and may be placed in a standby mode. Activating the chip select signal (e.g., via a high to low transition on CS_) may be utilized to start an operation, and returning the chip select signal to a high state can be utilized for terminating an operation. For internally self-timed operations (e.g., a program or erase cycles), memory device 104 may not enter standby mode until completion of the particular ongoing operation if chip select is de-asserted during the operation. Write protect (WP_) can be utilized for protection of sectors specified for protection by a register (e.g., the sector protection register). For example, such sectors may be protected against program and erase operations. Thus, if a program or erase command is issued to memory device 104 while the write protect pin is asserted, the device may ignore the command and perform no operation.

In this example SPI interface, which may be a "single SPI mode," data can be provided to memory device 104 via a serial input (SI) signal. The serial input can be utilized for data input including command and address sequences. For example, data on the serial input pin can be latched on a rising edge of SCK, and data on the serial input pin can be ignored if the device is deselected (e.g., when the chip select signal is de-asserted). Data can be output from memory device 104 via a serial output (SO) signal. For example, data on the serial output can be clocked out on falling edges of SCK, and the serial output signal can be in a high impedance state when the device is deselected (e.g., when the chip select signal is de-asserted). In particular embodiments, memory device 104 may support a variety of SPI modes or configurations, such as single SPI, QPI, and octal modes.

Memory device 104 can include a voltage regulator with an output that provides a voltage supply for various other components of the memory device, including a command user interface. When a NOR flash device is not actively reading or writing data (CS_ high=inactive), the device can either be in the standby mode, or in one of two possible "sleep" modes: deep power-down (DPD) or ultra-deep power-down (UDPD). The memory device may be placed into the UDPD or DPD mode by providing (e.g., from host 102) a predetermined command over the interface to the memory device. The UDPD or DPD mode can cause the output of the voltage regulator, along with appropriate voltage generation circuitry therein, to be disabled. In the standby mode, the memory device can immediately be able to receive a new command once CS_ is activated by going low. However, for the sleep modes, there is a certain wake-up time before returning to the standby mode and being able to accept commands.

In order to bring memory device 104 out of the sleep mode, a wake-up signal or other command may be provided to the memory device. Typically, the sleep mode consumes substantially less power than the standby mode. However, and as will be discussed in more detail below, the low-power (LP) standby mode of certain embodiments may consume an amount of power that is substantially close to that of the DPD mode. To accommodate the wake-up operation from a sleep mode, memory device 104 can include a wake-up circuit that remains powered on even when the memory device is in the UDPD or DPD mode. Receipt of the wake-up signal or command while the memory device is in the sleep mode can cause the output of the voltage regulator and associated circuitry to be enabled, thereby providing power to the components that were previously powered down. As will be discussed in more detail below, in certain embodiments, additional functionality can facilitate a fast wake-up operation from the low power standby mode. While the DPD sleep mode may generally preserve important internal parameters in SRAM or registers, the UDPD sleep mode may not, and as such the memory device may initially have to re-read these internal parameters from associated non-volatile memory when waking up from UDPD. In particular embodiments, the fast wake-up time duration from the DPD or LP standby mode can substantially include the time required to restart the VX charge pump, as opposed to the much greater time of re-reading internal parameters or performing other operations.

Many applications use flash memory devices in order to store program code. In some cases, the program code may be copied to an external or embedded microcontroller RAM after the application has powered-up. Since the code in this case is shadowed from the flash memory into RAM, the flash memory may not need to be accessed until the next power cycle. Thus, it can be desirable to place the flash memory device into as low a power mode as possible, in order to consume the least amount of current. Along these lines, some applications completely remove power from the flash memory device in order to reduce the power consumption. However, this approach may tend to increase application complexity and/or cost because an external power management device, such as a low drop-out (LDO) regulator, may be needed to manage the power to the flash memory device.

Figure 2:
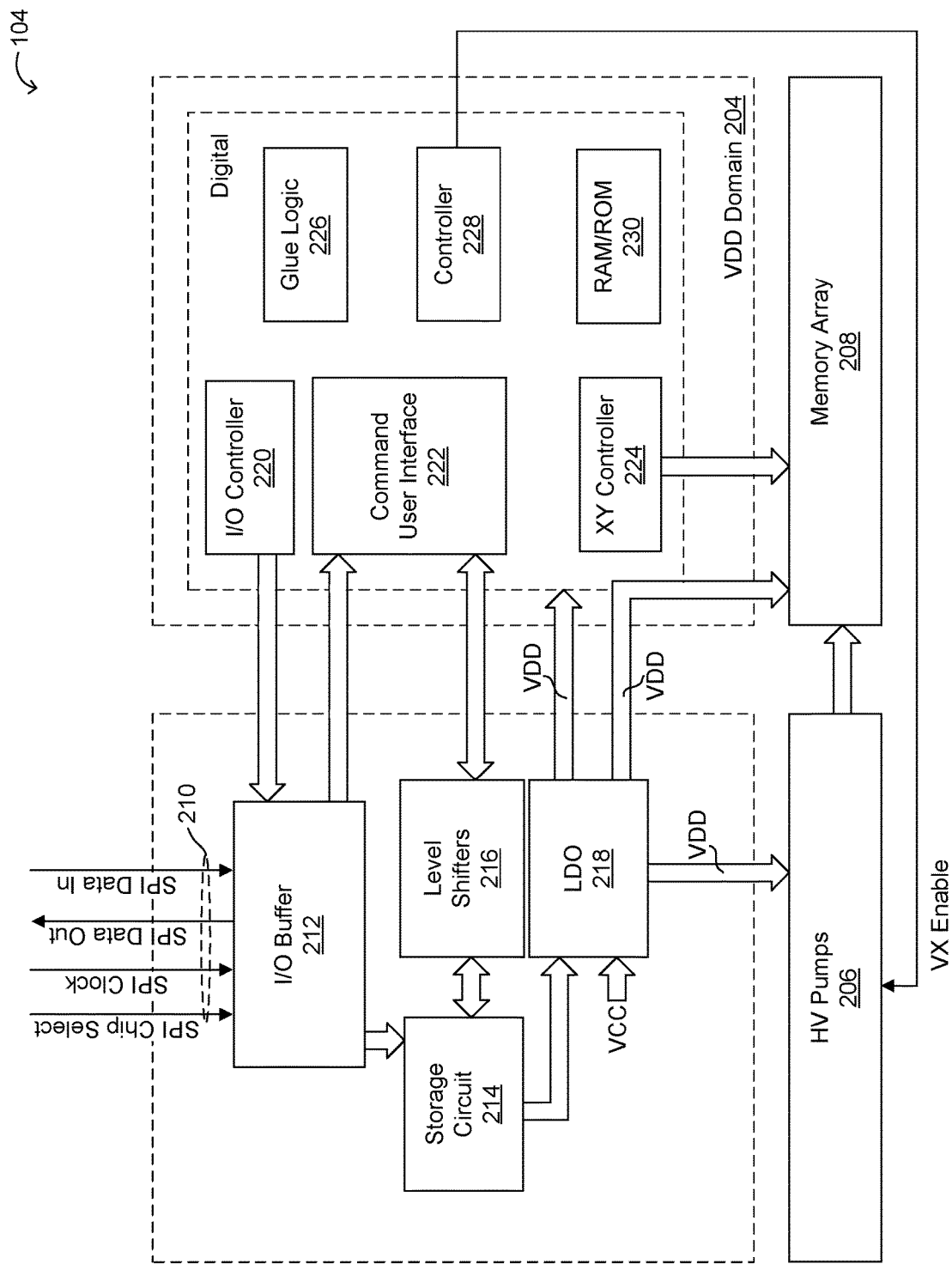
FIG. 2 is a schematic block diagram of various example data processing units in a memory device, in accordance with embodiments of the present invention.

Referring now to FIG. 2, shown is a schematic block diagram of various example data processing units in a memory device, in accordance with embodiments of the present invention. In general, memory device 104 can include VCC domain blocks (e.g., functional blocks or circuits that are powered by and operate using VCC power) 202, VDD domain blocks (e.g., functional blocks or circuits that are powered by and operated using a reduced or different power level VDD) 204, high voltage (HV) charge pumps 206, and memory array 208. The memory device 104 itself can be powered by an external VCC power supply, and can include low drop-out (LDO) regulator 218 having an output that serves as an internal on-chip voltage supply to provide the VDD voltage level to VDD domain blocks 204, high voltage charge pumps 206, and memory array 208.

Accordingly, VDD domain blocks 204, high voltage charge pumps 206, and memory array 208 may be powered by LDO regulator 218.

In this particular example, VCC domain blocks 202 may also include input/output buffer 212, level shifters 216, and storage circuit 214. For example, storage circuit 214 (e.g., latch, flip-flop circuit, etc.) can store the enabled/disabled state of LDO regulator 218. In addition, VDD domain blocks 204 can include various digital circuits, such as controller 228, input/output (I/O) controller 220, memory 230 (e.g., RAM and/or ROM), command user interface (CUI) 222, glue logic 226 in order to interface between other logic units, and XY controller 224 that interfaces with memory array 208. Level shifters 216 may be digital transfer devices that convert signals between the VCC and VDD supply domains. In some cases, the VCC domain may operate with 2.5 volts, whereas the VDD domain may operate with 1.8 volts, but these voltages may differ in other implementations. Controller 228 can generate various control signals, such as the VX enable signal to control turn on/off of the VX pump in HV pumps 206.

Operation of memory device 104 can be controlled by instructions from host processor 102. In this particular example, a valid instruction starts with the falling edge of the CS_ signal, followed by an 8-bit operation code (opcode) along with the buffer or main memory address location. In some cases, memory device 104 can store program code, which may be copied into external RAM or RAM embedded in host processor 102 after power up of the given application. If memory device 104 does not need to be accessed until the next power cycle, it may be desirable to place memory device 104 into as low a power mode as possible so as to consume the least amount of current. There also may be other situations in which it is desirable to place memory device 104 into such a power-down mode.

For example, a sleep mode (e.g., UDPD) can be accomplished by providing a unique predetermined 8-bit command opcode from host processor 102 to I/O buffer 212 over the SPI bus 210. After receiving the unique command opcode, buffer 212 may pass the unique command opcode to command user interface 222. Command user interface 222 can then pass the opcode to level shifter 216 that is associated with decoding the command. Level shifter 216 can convert the opcode to the appropriate VCC domain voltage level, and may transfer the opcode to storage circuit 214 (e.g., a flip-flop circuit). Storage circuit 214 may then generate a signal to cause the output of LDO regulator 218 to be disabled. Disabling the output of LDO regulator 218 can power off VDD domain blocks 204 of memory device 212, as well as memory array 208, and high voltage charge pumps 206. Thus for example, in the UDPD mode, all components that normally are powered by the VDD voltage supply can be completely powered down. By shutting down additional internal circuitry in memory device 104, the UDPD mode can allow memory device 104 to consume less power as compared to other low power or standby modes.

Since almost all active circuitry is shut down in the UDPD mode to conserve power, input/output controller 220 and command user interface 222 can be completely powered down during the UDPD mode. Since any additional data clocked into memory device 104 after the memory device enters the UDPD mode (and before it exits that mode) may be ignored, all subsequent commands may also be ignored until the device exits the UDPD mode. On the other hand, as all such commands may be ignored, the UDPD mode can be used as an extra protection mechanism against program and erase operations. However, all such subsequent commands may not be ignored, and predetermined certain command(s) may be accepted in order to provide a way to exit the UDPD mode. When memory device 104 is in the UDPD mode, the device can continue to be powered by the VCC voltage, such that VCC domain blocks 202 (including storage circuit 214, LDO regulator 218, and I/O buffers 212) may remain connected to the VCC voltage. Nevertheless, in this state, LDO regulator 218, which can be implemented as a relatively small circuit, can have a relatively small amount of leakage, thereby helping to maintain the overall power consumption of memory device 104 at a relatively low level during the UDPD mode.

The UDPD mode can allow the device to further reduce its energy consumption as compared to existing standby and deep power-down modes by shutting down additional internal circuitry. In "regular" deep power-down modes (e.g., the DPD mode), as opposed to an UDPD mode, LDO 218 may remain on, or otherwise the power to the memory array and other circuitry can remain on in cases where there is no LDO. In contrast, LDO 218 can be turned off during the UDPD mode in order to completely turn off all of the circuitry using the output thereof, including circuits in VDD domain 204, HV pumps 216, and memory array 208. When the memory device is in the UDPD mode, the read status register command, along with the exit from UDPD mode command (see, e.g., FIG. 6) may be the only commands that the device may recognize. When reading the status registers in this mode, all bits may read as "1", indicating that the device is in UDPD mode. All other commands, including the resume from deep power-down command, may be ignored, unless the same opcode (e.g., ABh) is employed for both the resume from the UDPD mode command as well as the resume from deep power-down mode command, such that the same command can be used to wake up from both sleep modes. In any event, since all write commands may be ignored, the UDPD mode can essentially be used as an extra protection mechanism against inadvertent or unintentional program and erase operations in some applications.

In particular embodiments, a low power standby mode that is similar to a sleep mode, such as the DPD mode, in terms of power consumption can be supported by memory device 104. For example, a storage element (e.g., a capacitor) can be utilized to maintain a supply voltage to allow one or more voltage regulators on the memory device to be turned off during this low-power standby mode to substantially reduce the power consumption. The storage element can also facilitate maintenance of the supply voltage at least until the voltage regulator turns on in the active mode (e.g., when a new command is received) and is sufficiently able to support the supply voltage without the help of the storage element.

Figure 3:
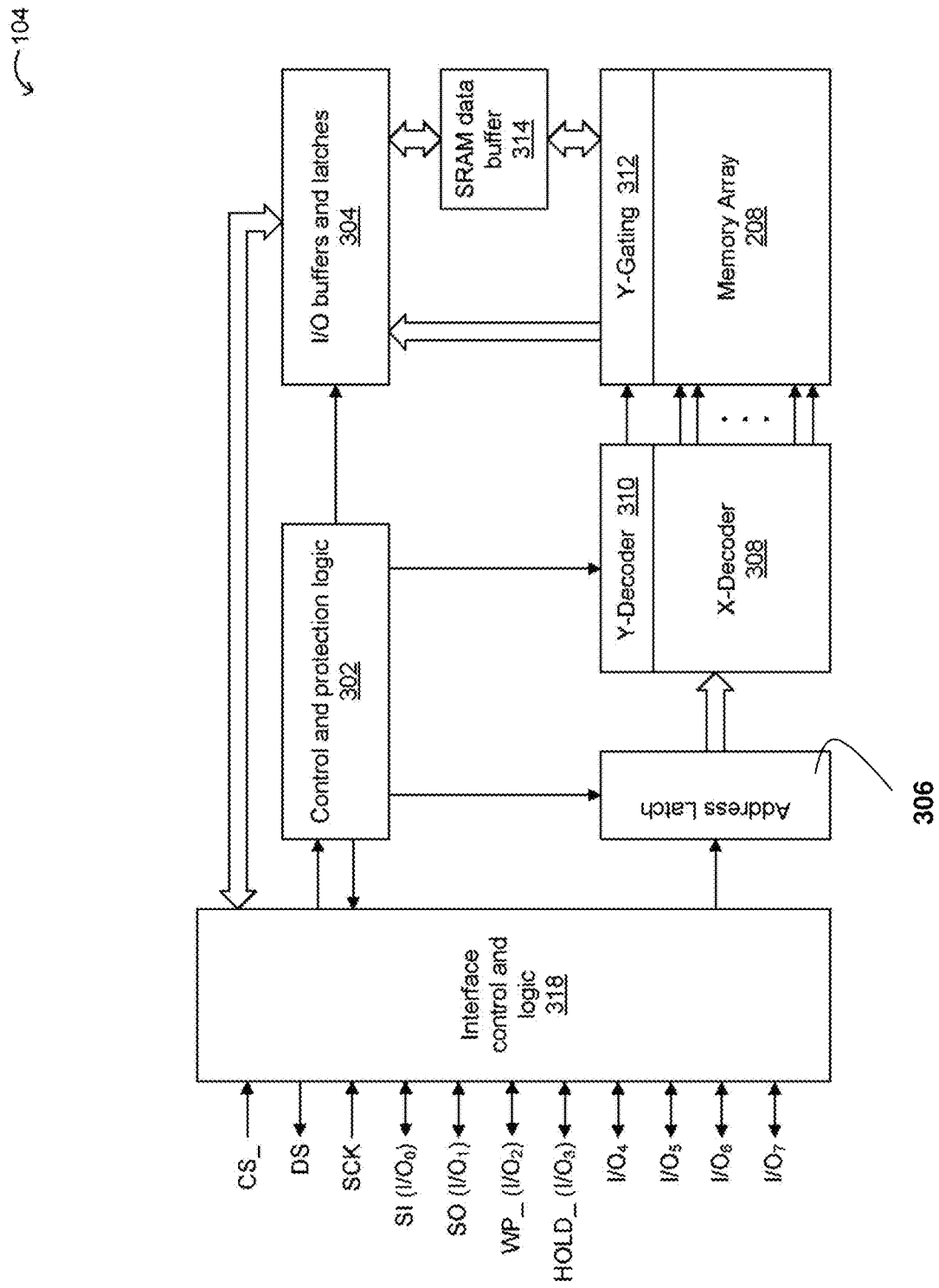
FIG. 3 is a schematic block diagram of an example memory device, in accordance with embodiments of the present invention.

Referring now to FIG. 3, shown is a schematic block diagram of an example memory device, in accordance with embodiments of the present invention. Memory device 104 can include interface control and logic 318, which may manage the interface (e.g., SPI interface), and decode the command and address information therefrom. Control and protection logic 302 can include control circuitry for reading and writing to the memory array, including address mapping and control for byte access and group addressing/ordering. For example, control and protection logic 302 can include a command decoder, registers for command execution parameters (e.g., read parameters, program/erase parameters, etc.), as well as a controller for command execution.

I/O buffers and latches 304 can control the input of data from interface control and logic 318, and the output of data to interface control and logic 318. For example, chip select based control and clock based control of data read from memory array 208 can be accommodated via I/O buffers and latches 304. That is, registers/latches in I/O buffers and latches 304 can be controlled by way of the toggling of serial clock SCK during burst reads and sequential fetch operations, as described herein. SRAM data buffer(s) 314 can buffer/store data between memory array 208 and I/O buffers and latches 304. Address latch block 306 can receive address information via interface control and logic 318, and may provide latched addresses to X-decoder 308 for row addresses, and to Y-decoder 310 for column addresses. Incrementing of addresses can be performed via address latch block 306 and/or control and protection logic 302. Y-decoder 310 can provide column addresses to Y-Gating 312, which can include pass gates or the like to multiplex I/O lines to/from memory array 208. As discussed above, memory array 208 can include an array of volatile memory cells, or non-volatile memory cells (e.g., CBRAM, ReRAM, Flash, etc.).

In some arrangements, more than one buffer 314 (e.g., SRAM or other fast access memory) can be provided, such as a buffer for an input path, and another buffer for an output path. Alternatively, or in addition, multiple buffers can be provided for multi-layer buffering. For example, memory device 104 can be configured as a data flash and/or a serial flash device. Memory array 208 can be organized as any suitable number of pages of data. For example, each page can include 256 or 264 bytes of data. Similarly, buffer 314 can store at least a page of data. I/O interface 318 can provide interfacing between memory array 208, buffer 314, and serial data input (SI) and output (SO). For example, I/O interface 318 may be part of an SPI or other serial type of interface, and may also support a number of SPI interface modes (e.g., Single SPI, QPI, Octal, x16 modes, etc.).

Figure 4:
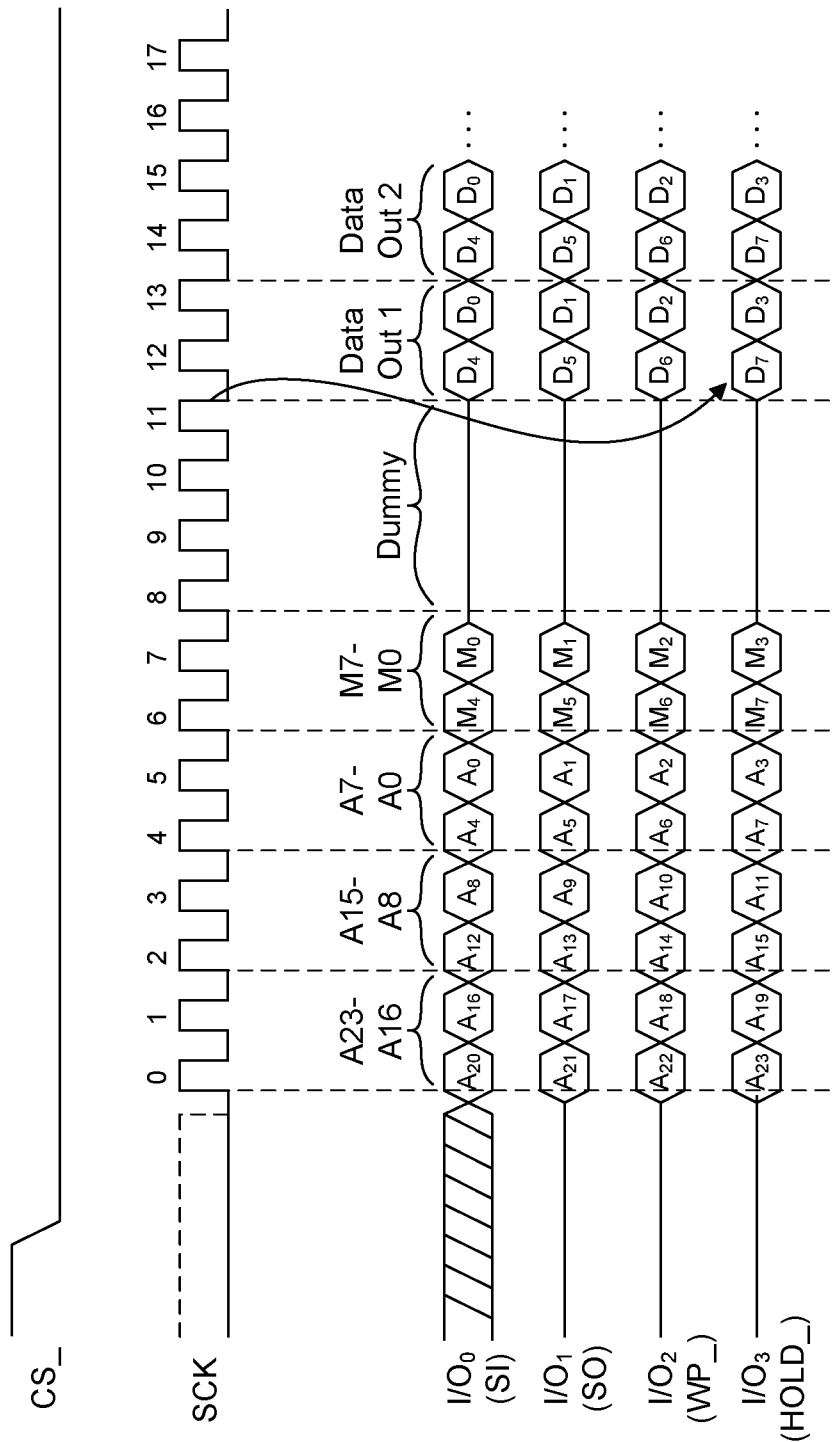
FIG. 4 is a timing diagram of an example read access, in accordance with embodiments of the present invention.

Referring now to FIG. 4, shown is a timing diagram of an example read access, in accordance with embodiments of the present invention. Example 400 shows a high-performance SPI read command that is a transaction in and execute-in-place (XiP) mode whereby the read command is implicit. Each byte takes two cycles of SCK over the four IO lines. In cycles 0 and 1, most significant address byte A23-A16 can be received, in cycles 2 and 3 address byte A15-A8 can be received, and in cycles 4 and 5 address byte A7-A0 can be received. Thus, 6 cycles can be used to receive the address via 4 pins. In cycles 6 and 7, the mode byte M7-M0 can be received. Thus, two cycles can be used to receive the mode byte via 4 pins, in order to indicate that the device should stay in the XiP mode. The dummy cycles can be cycles 8 through 11 for this example read command. Thus, four cycles are shown here for the dummy cycles prior to data being output from the flash memory starting at the falling edge of clock 11. For an 8-byte cache line of data, 16 cycles can be used to output the requested data. In addition, the gap between the next available command can be 4 cycles for short data bursts and 1 cycle for long data bursts.

Figure 5:
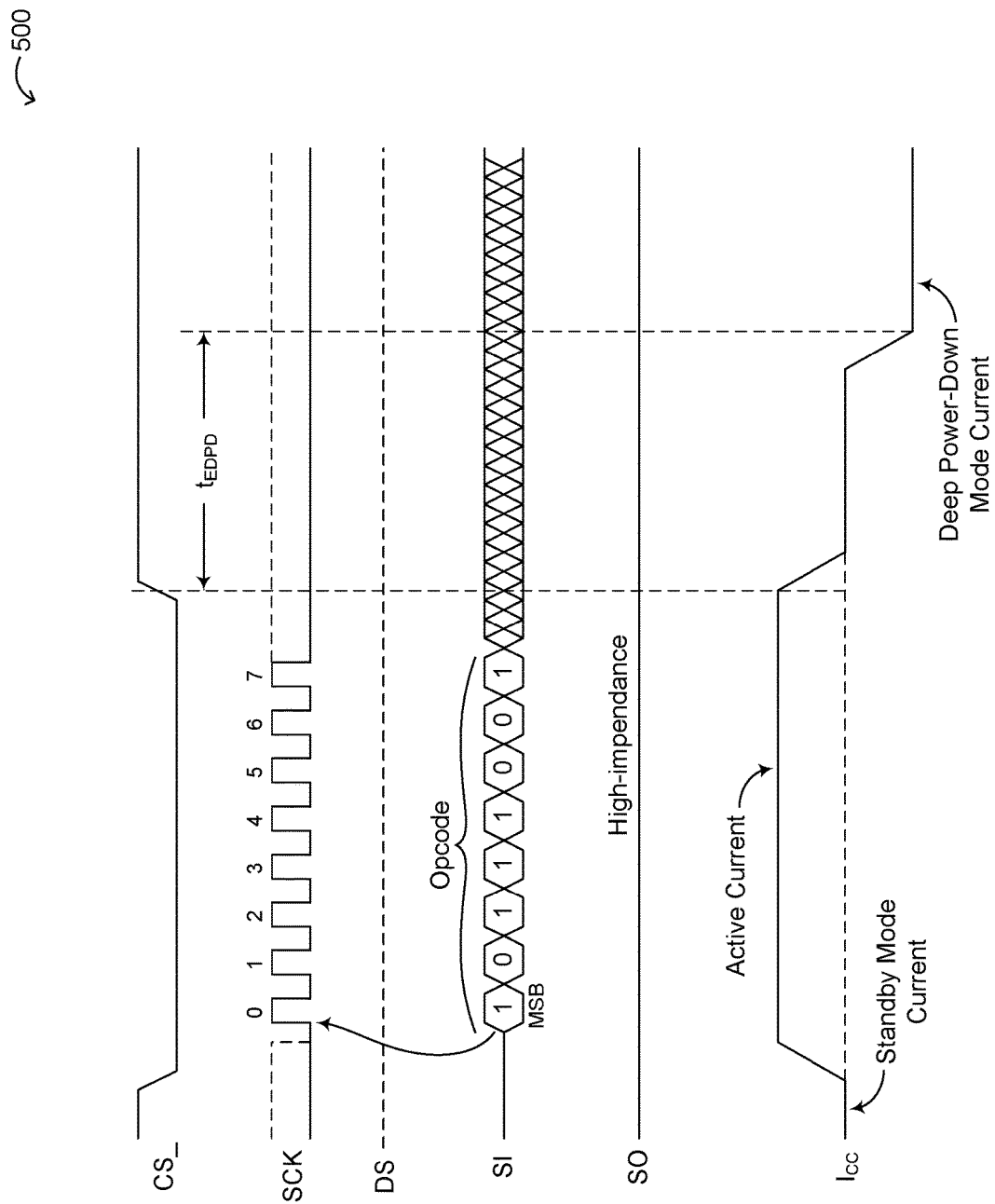
FIG. 5 is a waveform diagram of an example operation of entering deep power-down mode, in accordance with embodiments of the present invention.

Referring now to FIG. 5, shown is a waveform diagram 500 of an example operation of entering DPD mode, in accordance with embodiments of the present invention. Entering the sleep mode (e.g., DPD) may be accomplished by simply asserting the CS_ pin, clocking in the opcode (e.g., B9h), and then de-asserting the CS_ pin. Any additional data clocked into the device after the opcode may be ignored. When the CS_ pin is de-asserted, the memory device may enter the DPD mode within the maximum time of $t_{EDPD}$. For example, the complete opcode must be clocked in before the CS_ pin is de-asserted; otherwise, the device may abort the operation and return to the standby mode once the CS_ pin is de-asserted. In addition, the device may default to the standby mode after a power cycle. The DPD command may be ignored if an internally self-timed operation such as a program or erase cycle is in progress.

In some cases, all input pins may have to be at valid CMOS levels in order to minimize power consumption in the DPD mode. Upon recovery/exit from DPD, all internal registers (e.g., except the write completion status bit in a status/control register) may be at the power-on default state. In addition, memory device 104 may wake up in single SPI mode even if it was in QPI or octal mode, including double or multiple data rates, when it entered DPD mode. In some implementations, the DPD command may be ignored if an internally self-timed operation, such as a program or erase cycle, is in progress. As noted above, I/O controller 220 and command user interface 222 may be completely powered down during the DPD mode. As such, typically all opcode commands may be ignored by memory device 104 when the device is in the DPD mode. However, certain embodiments may support a predetermined opcode command sent over the SPI data in line of SPI bus 210 that may be used to bring memory device 104 out of the DPD mode (see, e.g., FIG. 6).

In one example, in order to wake memory device 104 and bring it out of the DPD mode, merely toggling the signal on the SPI CS_ line of SPI bus 210 will not be effective. Rather, a predetermined opcode (e.g., ABh) may be provided and decoded via dedicated circuitry in I/O buffer 212 and storage circuit 214. When memory device 104 is in the DPD mode, buffer 212 may clock in and pass the serial input signals directly to storage circuit 214, which can generate a signal to cause the output of LDO regulator 218 to be enabled in the event of a match of the predetermined opcode. Enabling the output of LDO regulator 218 can provide the VDD voltage to the various VDD domain blocks 204, as well as to high voltage charge pumps 206 and memory array 208, thus restoring memory device 104 to the standby mode. Thus, although memory device 104 is placed into the DPD mode using a certain command (e.g., the opcode), the memory device can be brought out of the DPD mode using appropriate hardware features of memory device 104, or a different command/opcode.

In particular embodiments, the chip select signal can alternatively be used for other purposes than getting the memory device out of the DPD mode. In this case, the chip select signal can be utilized in order to send the memory device a command without waking the device up. In this way, other wake-up signals or commands can be employed in order to exit the DPD mode. For example, the status read command, along with a dedicated wake-up from DPD command (e.g., opcode=ABh), can be employed in order to control memory device 104 to exit from the DPD mode. In one example, the status read command can provide status data while not bringing the memory device out of the DPD mode, while the wake-up from DPD command may be an SPI command that brings memory device 104 out of UDPD mode.

Figure 6:
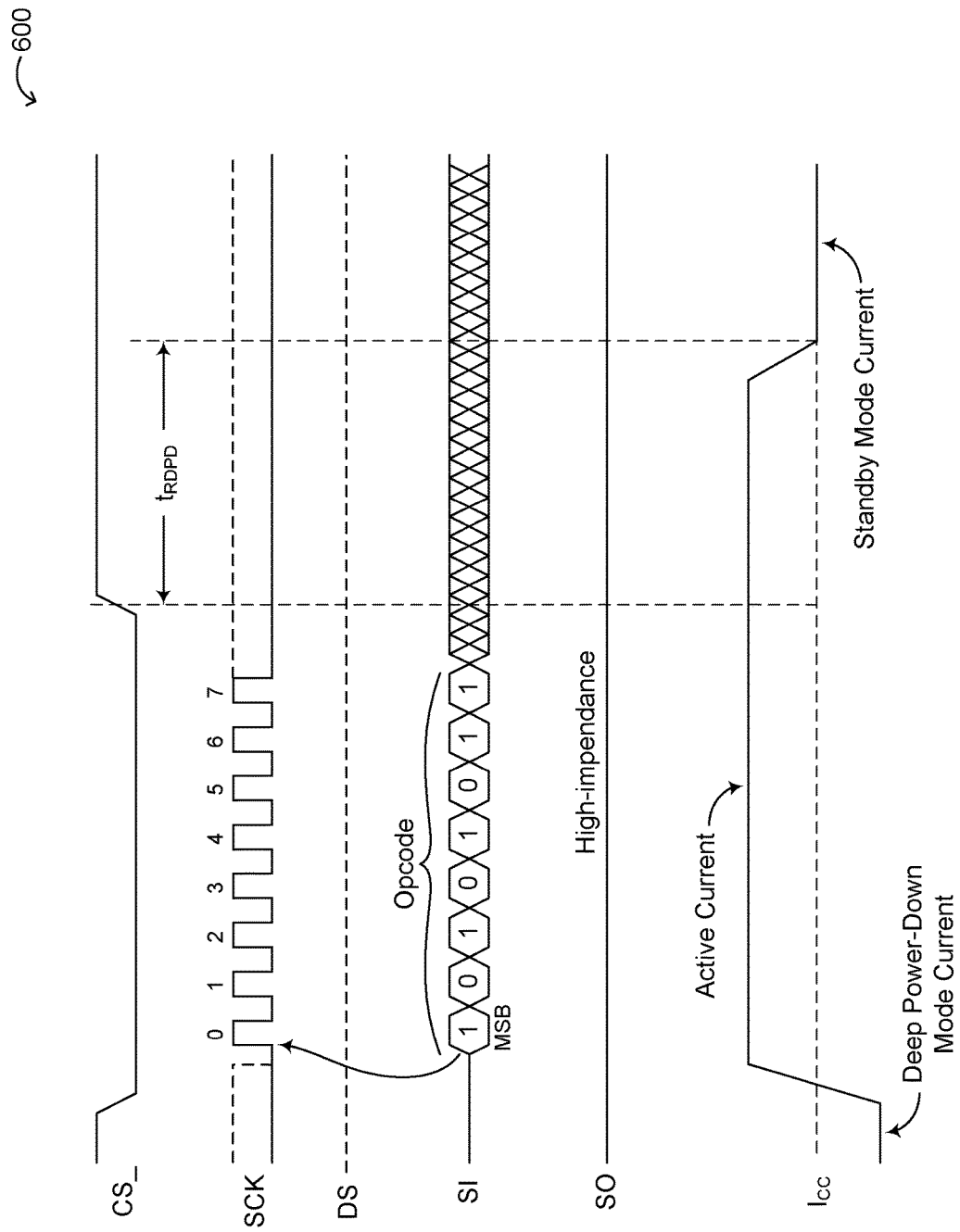
FIG. 6 is a waveform diagram of an example dedicated resume command to exit deep power-down mode, in accordance with embodiments of the present invention.

Referring now to FIG. 6, shown is a waveform diagram 600 of an example dedicated resume command to exit DPD mode, in accordance with embodiments of the present invention. The resume from power-down mode predetermined/dedicated command (e.g., opcode=ABh) may be the only instruction that will wake the device up from the power-down mode or DPD modes. In this case, other commands may be ignored when the memory device is in the DPD mode. In this instruction command, after the CS_ pin is brought low, the "RES" or resume instruction can be applied. At the end of the instruction, the CS_ pin can be brought back high. The rising edge of the SCK clock number 7 (e.g., 8th rising edge) can initiate the internal RES instruction. The memory device can become available for read and write instructions $t_{RDPD}$ after the $8^{th}$ rising edge of the SCK, as shown.

Particular embodiments may be suitable for non-volatile memory devices, such as serial NOR flash memory devices, but may also be applicable to other memory technologies, including volatile memory devices (e.g., DRAM, SRAM, etc.). In particular embodiments, lower power consumption and/or a shorter wake-up time from a sleep mode (e.g., a DPD mode) can be supported. For example, the power consumption in the standby mode for a serial NOR flash memory device can be substantially reduced, even down to a level that may be only slightly above that of the DPD sleep mode. This can be important in applications whereby the host controller (e.g., 102) may not be capable of utilizing the designated sleep modes (e.g., DPD, UPDP) of the memory device, and where minimizing power consumption remains important. This low power standby mode can further be considered an instant wake-up from the DPD sleep mode or other sleep modes, which could otherwise take, e.g., about 5 μs.

In order to combine the fast response time of a standby mode with the low current consumption of a DPD sleep mode, most of the circuitry that is normally on during a regular standby mode may also be turned off in the low power standby mode. Voltage regulator circuitry, such as the VX charge pump, are typically the major contributors to regular standby mode power consumption. Particular embodiments may store energy in order to supply the read circuitry with the needed power to start read operations immediately after entering the active mode and receiving a read command. For example, an external capacitor can be connected to the output of the VX pump to store this energy. The connection point of the external capacitor can be an additional power supply pad (e.g., VX pad). Enough energy can be stored in the external capacitor to supply the read circuitry current for the time required to restart the VX pump (e.g., the DPD wake-up time), and to compensate for the energy loss of the capacitor during the standby mode, which can depend on the type of capacitor used and the internal leakage in the memory device.

In particular embodiments, in addition to normal decoupling capacitor(s) between $V_{CC}$ ($V_{DD}$) and GND ($V_{SS}$), an additional power supply pin and a capacitor between this supply pin and GND ($V_{SS}$) can be included. For example, the additional power supply pin in some cases may also be utilized as a high voltage program supply ($V_{PP}$), and/or may be supplied from an external voltage supply. If the VX pin/pad is used as a $V_{PP}$ pad for fast production programming, additional circuitry can be included in the memory device. If the VX pin/pad is fed from an external supply voltage, the circuit that generates the VX voltage externally may be more efficient than the on-chip VX pump, in order to provide overall power savings by disabling the on-chip VX pump.

As discussed above, when a NOR flash device is not actively reading or writing data (CS_ high=inactive), the device can either be in the standby mode, or in one of two possible sleep modes: DPD or UDPD. In the standby mode, the memory device can immediately be able to receive a new command once CS_ is activated by going low, while a certain wake-up time may need to elapse from a sleep mode before returning to the standby mode and being able to accept commands. In many designs, the standby current consumption may not be substantial with respect to the overall energy budget because the read operation current is typically 500-1000 times higher than the standby current, and program and erase operation currents can be even higher. However, the instantaneous power of a high-speed read operation may be higher than that of a program/erase operation because these are relatively slow operations as compared to the read operation.

In a system using shadow Flash (or boot memory), the non-volatile code storage is typically an external memory device. For relatively small memories under one megabit, this external memory can be an EEPROM device. For devices from one megabit to one gigabit, the dominant memory type is serial NOR Flash, while NAND Flash memory types dominate above one gigabit. Before the CPU can start running, its code can be copied from Flash to RAM. During operation, the CPU is typically running code from RAM only, not directly from Flash memory. The system can also have additional RAM for data storage. Small systems may use on-chip SRAM, while larger systems may use external DRAM or PSRAM. Larger systems may use a simple file system or a more complex operating system (e.g., Linux) to load files from the Flash as they are needed. The Flash device may in this case be much larger than the RAM. This is similar to what is done on a PC with RAM and disk drive, just smaller.

With XiP memory, the goal is to use an external NV memory device to provide the same fast access time as one would get from an embedded NV memory, without having to first copy everything over to RAM. This saves the cost of embedded Flash, which is much higher per megabyte than external NOR Flash, and the cost of RAM, which is even higher. It may also save power, as RAM requires power to maintain its memory content, even if the CPU is sleeping. XiP memory can either be used as program extension for SoCs with embedded Flash, or it may be used as the main program storage for SoCs built on a standard CMOS process. In both cases, the CPU can be built with an instruction cache. Each time the CPU loads an instruction, it can first check in the cache memory to see if that address location has already been loaded into the device. If it has, the CPU can load the instruction from cache; if not, the CPU can start a read operation from the Flash in order to fill the missing cache line. As most software uses a lot of loops, the chance of finding the next instruction in the cache may actually be quite high, and it is easy to achieve cache hit rates in the range of, e.g., about 95%-99%.

The XiP memory model is also beneficial for many of the applications that now start adding artificial intelligence (AI) to their systems. When AI is added to end node systems, instead of being a centralized computer center function, these devices may then require a relatively large program memory, while at the same time they are running high-performance time-critical applications. AI applications may need to go through a large amount of data in a relatively short period of time. These AI systems may have to store large data tables (e.g., inference tables) containing AI coefficients in NV memory, and then read these tables repeatedly as the coefficients are applied to new datasets. In an end node, power consumption and performance are both critical factors. Therefore, an inference engine here may need to go through a large number of NVM-stored coefficients in a very short time and with minimal power consumption. The data sets can be too large to fit in the cache memory, so the raw bandwidth of the interface between the Flash and the host controller can become the critical factor for maximum performance. Embedded Flash may only address low-to-mid-range products, while suffering from limited scalability, limited memory, restricted performance, relatively high power consumption, and high cost. The boot memory model may be used, loading all the inference tables from external NV memory to external DRAM memory, but the increased power consumption and cost may mean this setup only works for the highest end products. XiP memory may have the fast wakeup time and low standby current consumption of a large embedded Flash, but without the high costs that a multi-megabyte embedded Flash can demand. It is therefore becoming a popular memory choice for end node AI applications.

In boot-up applications, the memory device can be read once at power up, and may spend the remaining time in the DPD or UDPD mode, or the memory device can be switched off via an external switch. In these types of applications, the system may spend very little time in the standby mode, and standby current consumption may accordingly be insignificant. In most XiP applications and AI applications, such as reading inference tables from flash memory, when the MCU is executing code (e.g., active read periods), the duty cycle may be high enough to make the read current dominant. During inactive periods, the DPD or UDPD sleep modes may be utilized in order to minimize energy consumption. However, in some applications, the wake-up time from sleep modes may be too long for the sleep modes to be particularly useful. In other cases, the host controller may not be able to send a wake-up command prior to beginning read operations. In these cases, the user may not utilize the supported sleep modes of the memory device, and may instead leave the memory device in the standby mode. As such, the standby current consumption may become the dominant factor, and as such should be reduced for customers aiming to reduce the overall current consumption.

When in the standby mode, the memory device is ready to "immediately" receive and begin execution of a command from the host device. The wake-up time ($t_{CSLCKH}$) is typically about 5-6 ns, which may be less than a typical SPI clock cycle. For example, typical standby current consumption may be about 10-15 µA, with new devices having a target of about 8 µA. Also for example, the DPD wake-up time can be about 5 µs, up to a maximum of about 8 µs. For example, in a system running at a 100 MHz SPI clock, the wake-up time would equal 500-800 SCK cycles, which translates to 250-400 bytes read at quad SDR. For an XiP system, this equates to 8-12 cache lines, which is more than 2× the typical read burst for a cache miss. Therefore, an XiP system may not take advantage of the DPD sleep mode during periods of active operation. Further, the UDPD wake-up time is about 10-20 times longer than that of DPD, while the current consumption is about 10-100 times lower in the UDPD mode. However, because wake-up from UDPD may require parameter reads from flash memory, this sleep state may not be suitable for low power standby operation.

In particular embodiments, a standby current may be reached that is not substantially more than the DPD current (e.g., less than 2 µA total). For example, the low power standby current can include about 1 µA for the DPD mode and 1 µA for any additional circuitry required low power standby mode. The current consumption for additional circuitry can mostly include leakage current in external capacitor(s), with associated trade-offs for a given application between cost, leakage current, and maximum standby time. The associated costs of implementing the low power standby mode can include additional silicon area, increased package cost, and external components (e.g., a capacitor). As described herein, this low power (LP) standby mode can be implemented, and may also be considered an "instant" wake-up from the DPD sleep mode.

Figure 7:
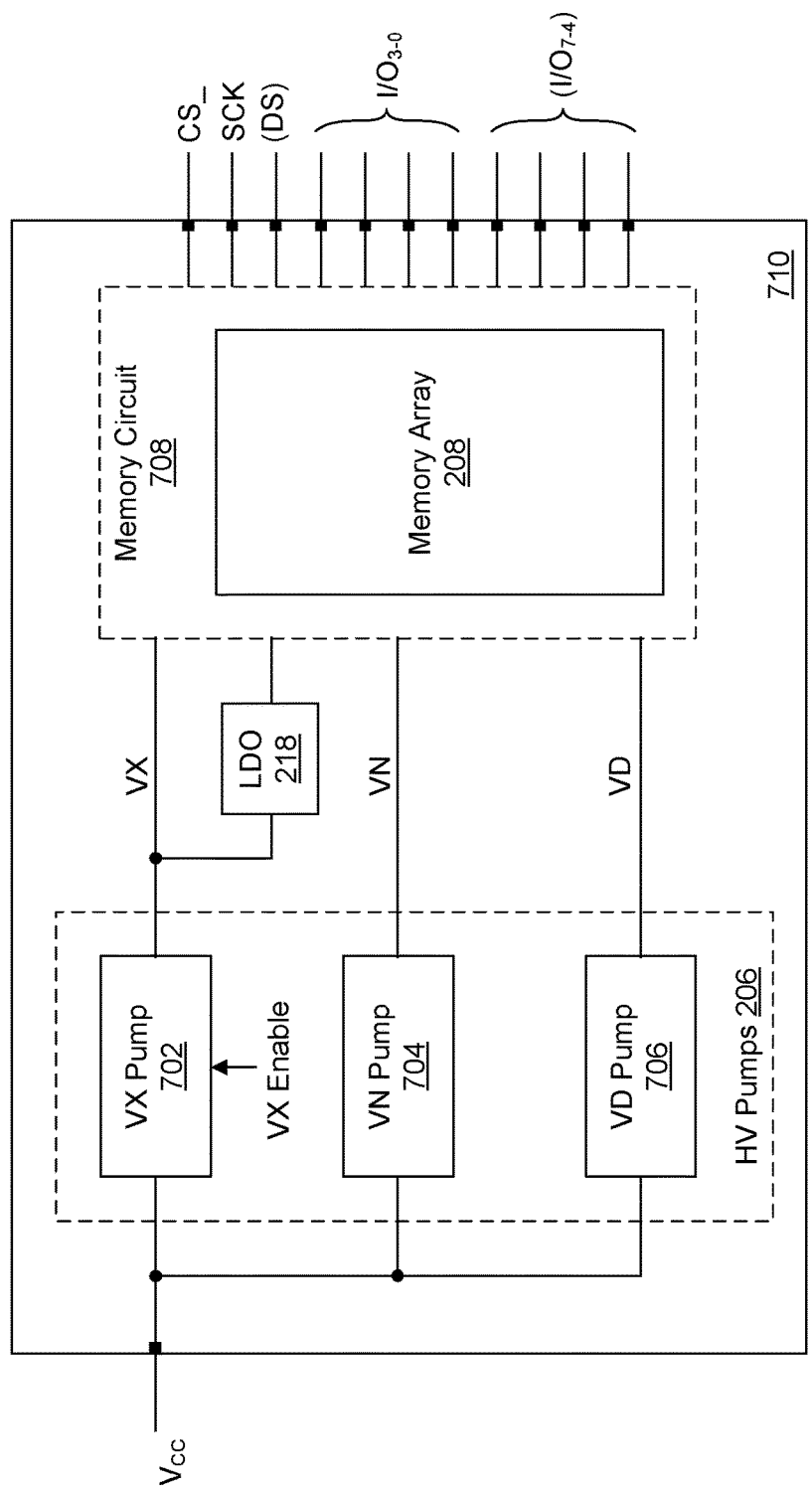
FIG. 7 is a schematic block diagram of example internal power supplies in a memory device, in accordance with embodiments of the present invention.

Referring now to FIG. 7, shown is a schematic block diagram of example internal power supplies in a memory device, in accordance with embodiments of the present invention. In example 700, HV pumps 206 can include VX pump 702, VN pump 704, and VD pump 706, and memory circuit 708 that includes memory array 208. It should be noted that the squares on $V_{CC}$, CS_, SCK, DS, and $I/O_{7-0}$ represent external pins and/or pads for connectivity between circuitry found on IC/device 710 and external circuitry. Examples of voltages and currents supplied by the respective pumps and regulators for different modes of operation (e.g., standby, read, program, and erase) are shown below in Table 1. The "active" modes can include read, program, and erase operations. Also, VX enable (e.g., from controller 228) can control the on/off status of VX pump 702.

TABLE 1

| Mode | VX Pump | VN Pump | VD Pump | VR-read, VDAC verify | Read-circuit |
|---|---|---|---|---|---|
| Standby | 10 V, pump from $V_{DD}$ (1.8 V) | No | No | No | $V_{DD}$, no current |
| Read | 10 V, 1 mA | No | No | 5 V, regulated down from VX | 100 µA/sense-amp |
| Program | 12 V, 2 mA | −2 V, 200 µA | 2 mA (8 bits program) | 10 V, regulated down from VX | 100 µA/sense-amp |
| Erase | 12 V, 2 mA | −12 V, 500 µA | 2 mA (8 bits pre-program) | 10 V, regulate down from VX | 100 µA/sense-amp |

For read operations, only charge pump that may be used is VX pump 702. For example, the output voltage from VX pump 702 may be 10V, as may be needed for program and erase operations. The required voltage for read operations may only be 5V, which can be regulated down from the VX voltage. The VX voltage during read can be much lower than 10V, as long as a low-dropout regulator (LDO) 218 is used. For example, if the required current for read operations is about 100 µA per sense amplifier, so for 128 sense amplifiers the total current would be about 13.8 mA, and for 32 sense amplifiers the total current would be about 4.2 mA.

Figure 8:
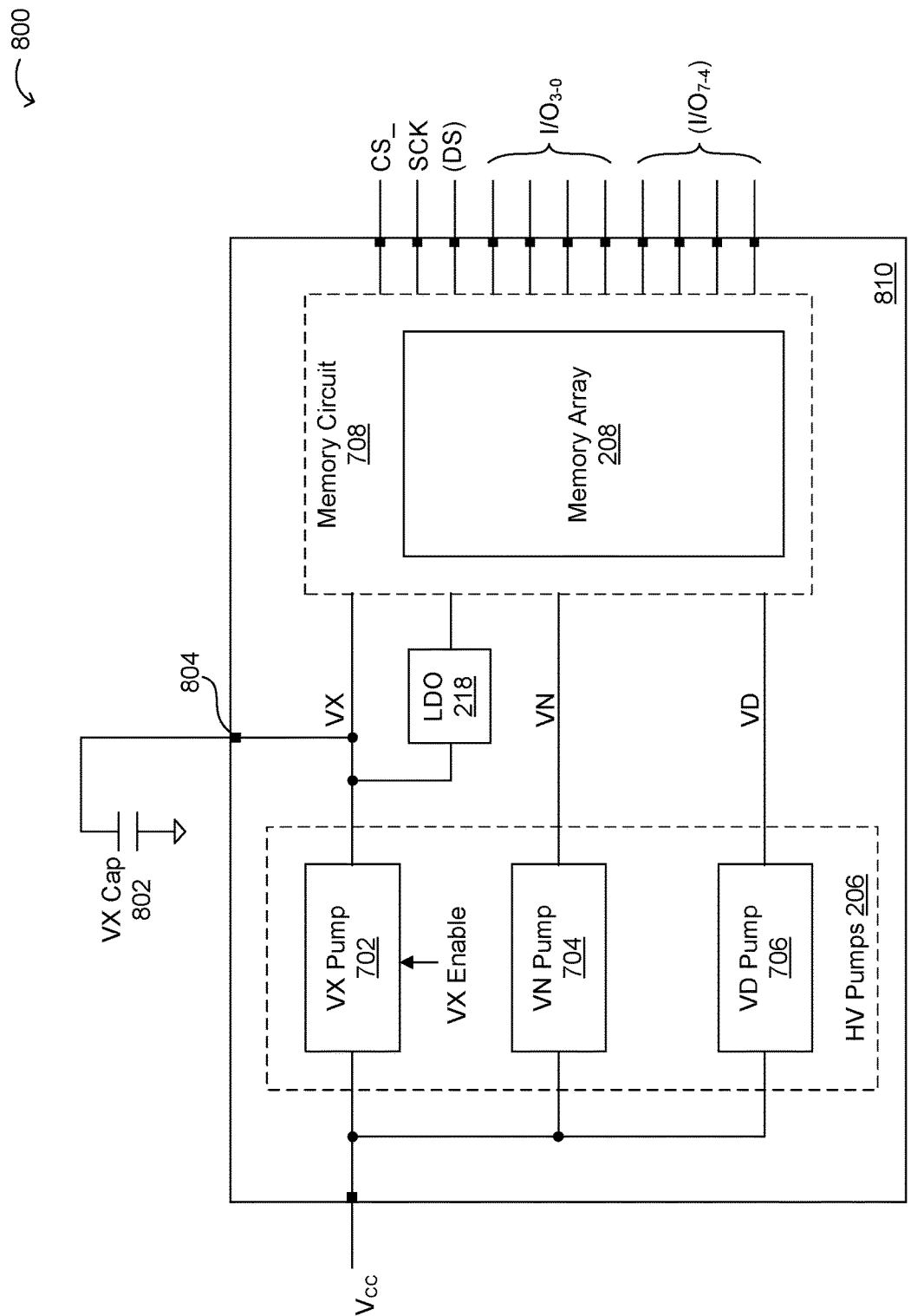
FIG. 8 is a schematic block diagram of example internal power supplies in a memory device and an external storage element, in accordance with embodiments of the present invention.

Referring now to FIG. 8, shown is a schematic block diagram of example internal power supplies in a memory device and an external storage element, in accordance with embodiments of the present invention. In particular example 800, external capacitor VX cap 802 can connect to VX pad and external pin 804. As such, an extra power supply pad VX pad 804 can be added to the memory device, and may be directly connected to the output of VX pump 702. In addition, power switches can be included in order to minimize leakage from capacitor 802 during various operations. In any event, VX cap 802 may hold enough charge to supply memory circuit 708 during the start of the read operations and until VX pump 702 is able to sufficiently supply the VX after being enabled (e.g., VX enable active high), which may be about as long as the wake-up time from the DPD sleep mode. During the LP standby mode, VX pump 702 can be turned off (e.g., VX enable going low), as is done for the DPD sleep mode. It should be noted that the squares on $V_{CC}$, CS_, SCK, DS, and $I/O_{7-0}$, as well as 804 in this particular example, represent external pins and/or pads for connectivity between circuitry found on IC or device 810 and external circuitry.

In particular embodiments, in a device that combines the fast response time of standby mode with the low current consumption of the DPD sleep mode, most of the circuitry that is normally on during a standard standby mode can be turned off, with the most important contributor being VX charge pump 702. In addition, energy can be stored in order to supply the read circuitry with the needed power to start read operations immediately after receiving a read command and thus transitioning from the standby mode to the active mode. For example, external capacitor 802 can store this energy, and may be connected to the output of VX pump 702. In addition, sufficient energy can be stored in order to supply the read circuitry for the time period it takes to restart VX pump 702 (e.g., about the DPD wake-up time), and to compensate for energy loss from capacitor 802 while in the standby mode. Such energy loss from the external capacitor can greatly depend on the type of capacitor used and the internal leakage at the node (e.g., the VX supply node) in the memory device where the capacitor is connected.

If there is no VX cap 802 connected to the memory device, such as for cost sensitive applications, the device may simply function as a standard flash memory device with no LP standby mode enabled, but retaining the standard standby mode operation. In many cases, VX cap 802 can also help to reduce the ripple on the VX voltage output from VX pump 702, which may improve read speed or read power consumption. Also, while the VX pump is the largest contributor to current consumption in normal standby mode, other blocks (e.g., SRAM, logic) can also contribute to the standby current consumption. As such, it is desirable to reduce the power consumption of these other blocks to the point where it becomes insignificant (e.g., much less than about 1 µA).

When the memory device receives a read command, the device starts reading immediately using supply currents from VX cap 802 and $V_{CC}$, thus not waiting for VX pump 702 to restart. The VX pump can be restarted, and may become fully operational prior to VX cap 802 being discharged too much to affect ongoing operations. The VX cap 802 can thus be chosen correctly for a given application to achieve this, as will be discussed in more detail below. As the VX voltage increases further, VX pump 702 can start recharging VX cap 802. Because the VX current consumption for read operations is less than for program/erase operations, there can be additional current available for recharging capacitor 802. If, however, VX cap 802 is not fully recharged by the time the read operation has completed, the memory device may not immediately return to the LP standby mode. In such a case, the memory device can keep VX pump 702 running and may effectively stay in a normal/standard standby mode with additional current consumption until VX cap 802 is fully recharged. In some cases, a few additional dummy cycles may be utilized in order to provide the necessary time for VX pump 702 to stabilize.

Program and erase operations may employ other pumps 704 and 706 in addition to VX pump 702. However, these operations do not require an immediate response from the memory device back to the host device that issued the write command. Essentially, the program/erase operations take so much time anyway that the additional time (if any) that may be required to get the VX pump to stabilize would likely not be noticeable to the overall system. As such, program/erase operations may not substantially differ given the LP standby mode versus the normal or standard standby mode.

In some cases, VX pad/pin 804 could multiplex between output voltage VX and another compatible circuit, such as a suitable high-voltage supply pad or another pad that can include transistors to handle high-voltage supplies (e.g., 9.5V or more). In any case, leakage at this VX node should remain as low as possible, particularly as the high-voltage may be generated from a relatively inefficient charge pump on the memory device. In one example, the VX pad can be multiplexed with a $V_{PP}$ pad that is used for fast production programming. This approach may also need additional on-chip circuitry because the $V_{PP}$ programming voltage may have to be fed to the output of the other charge pumps (e.g., VN pump 704 and VD pump 706) as well.

In another example, the VX pad can be a direct supply voltage to receive an external VX voltage that is supplied from another device. The on-chip VX pump 702 in this case could then be left unused for read operations. If the external power circuitry can be made to be more efficient than the on-chip charge pump, power on the memory device may be saved for all read operations. For write operations, a single stage charge pump may be used to pump up to the higher voltage required for program/erase operations. Alternatively, this higher voltage may be supplied all the time as an external supply and VX pump 702 may be removed from the chip altogether, in order to save die area in this case.

Figure 9:
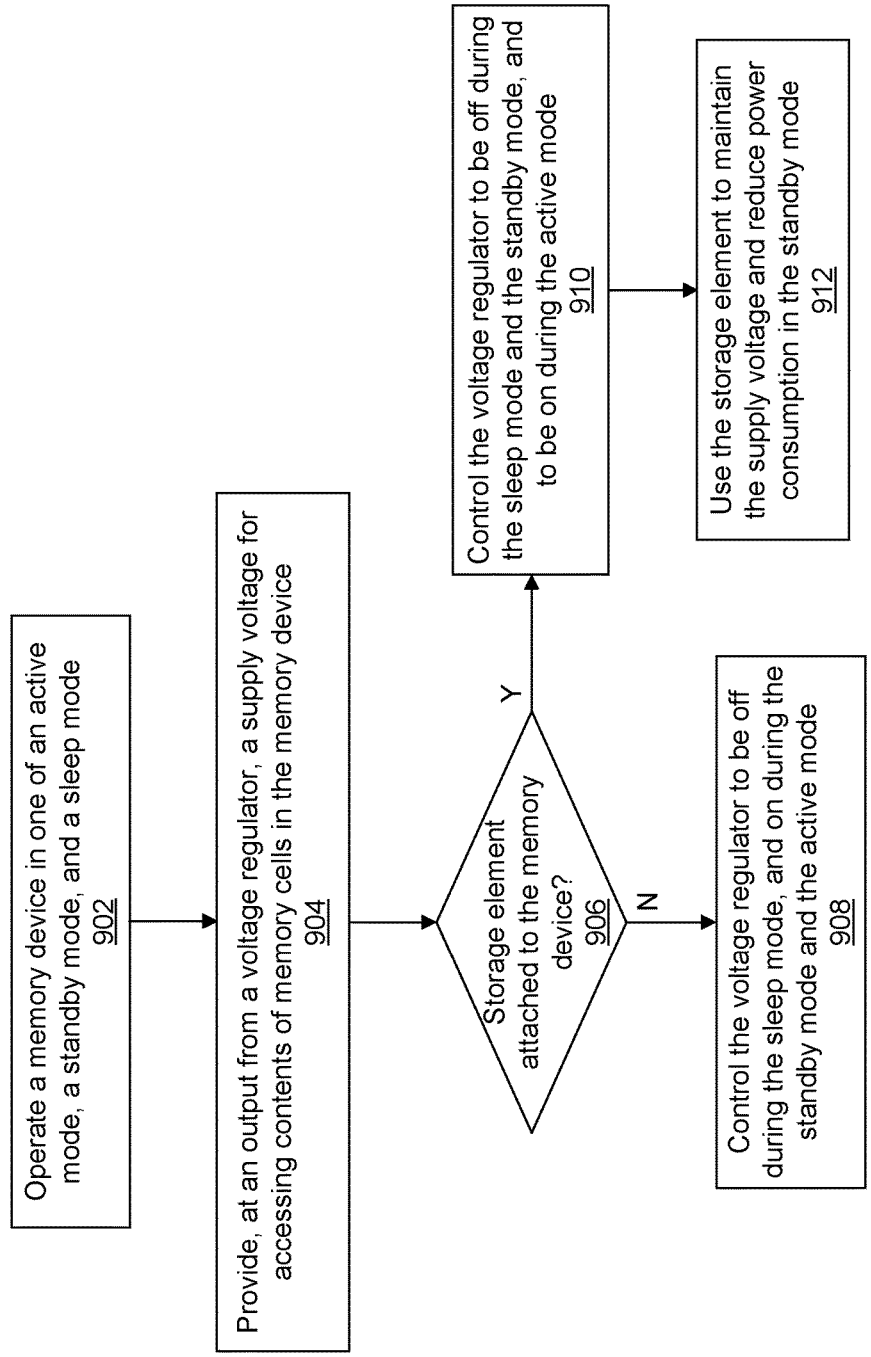
FIG. 9 is a flow diagram of an example method of controlling a memory device, in accordance with embodiments of the present invention.

Referring now to FIG. 9, shown is a flow diagram of an example method of controlling a memory device, in accordance with embodiments of the present invention. In example 900, a memory device can be controlled by operating the device in one of an active mode (e.g., read, program, erase), a standby mode, and a sleep mode (e.g., DPD) at 902. The memory device can be ready receive a command from a host device when in the standby mode (e.g., the LP standby mode). At 904, a supply voltage can be provided at an output from a voltage regulator (e.g., 702) for accessing contents of memory cells (e.g., in memory array 208) in the memory device. The voltage regulator (e.g., VX pump 702) can be off during the sleep mode (e.g., the DPD mode) and the LP standby mode, and the voltage regulator can be on during the active mode. At 906, the device can determine whether a storage element (e.g., VX cap 802) is attached to the memory device (e.g., at VX pad 804).

If there is no storage element attached thereto, the memory device at 908 can control the voltage regulator to be off during the sleep mode, and to be on during the standby (e.g., normal/standard standby mode in this case) and active modes, as in the normal/standard standby mode. If there is a storage element attached to the memory device, the memory device at 910 can control the voltage regulator to be off during the sleep mode and the standby mode (e.g., LP standby mode in this case), and to be on during the active mode. In this way, a low power (LP) standby mode can be supported. Thus, control of the VX enable signal can vary depending on whether the LP standby mode is supported. In addition, at 912, the storage element can be used to maintain the supply voltage and to reduce power consumption when in the standby mode. For example, the storage element can be used to allow the voltage regulator to be turned off during the standby mode, and at least until the voltage regulator turns on in the active mode and supports the supply voltage (e.g., VX).

Figure 10:
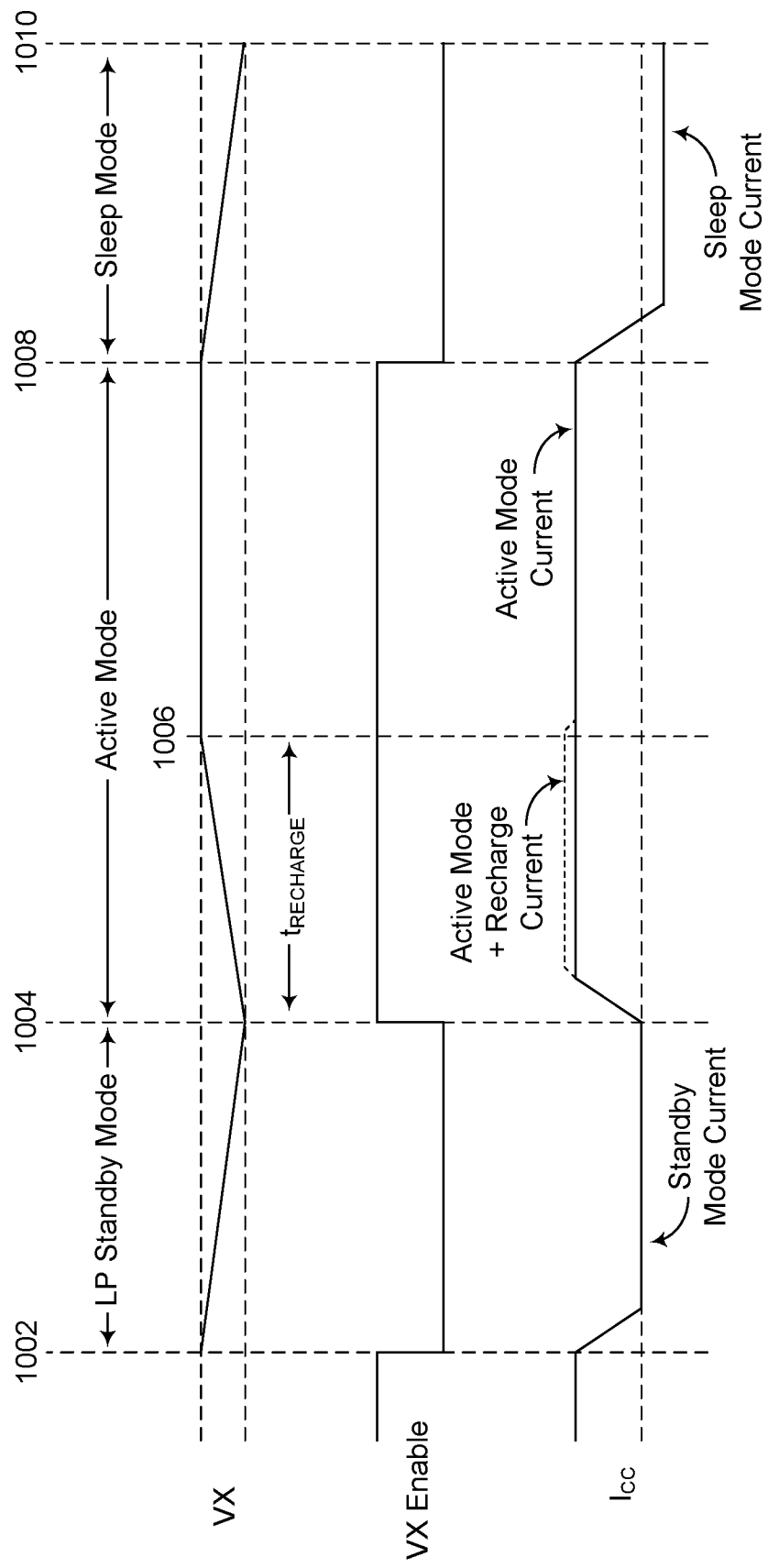
FIG. 10 is a waveform diagram of an example VX pump control, in accordance with embodiments of the present invention.

Referring now to FIG. 10, shown is a waveform diagram of an example VX pump control, in accordance with embodiments of the present invention. Example 1000 shows waveforms of the VX voltage level, as well as the VX enable control signal and the memory device current $I_{CC}$ in various modes of operation. It should be noted that the $I_{CC}$ waveform is not shown at scale in this diagram, as there can be orders of magnitude of difference between the active current, the standby current, the DPD current, and the UDPD current. At 1002, the memory device can enter an LP standby mode, and VX enable can go low to disable VX pump 702. During the LP standby mode, the VX voltage can gradually lower due to VX cap 802 discharging without being resupplied by VX pump 702. At 1004, the memory device can enter an active mode (e.g., a read operation) plus a recharge mode, whereby VX enable goes high to turn on VX pump 702 and to bring VX back to its full level at 1006. For example, the current between 1004 and 1006 can be greater than in a standard active mode due to the recharging of VX capacitor 802. At 1008, the memory device may enter a sleep mode (e.g., DPD mode), and VX enable can go low to turn off VX pump 702. As such, at least until 1010, the level of VX may decrease due to VX cap 802 discharging until VX pump 702 can again be enabled.

Figure 11:
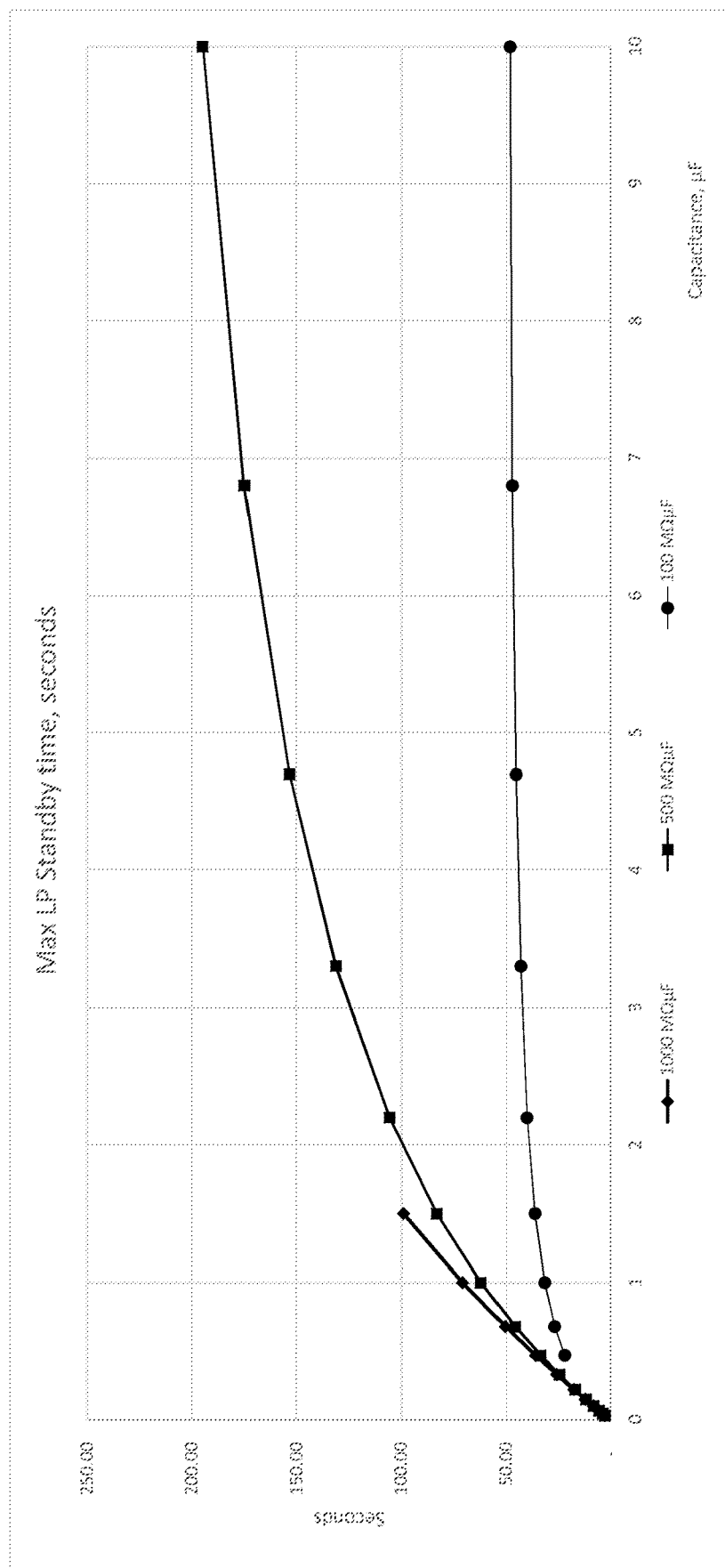
FIG. 11 is a waveform diagram of first example capacitor characteristics for maximum standby time, in accordance with embodiments of the present invention.
Figure 12:
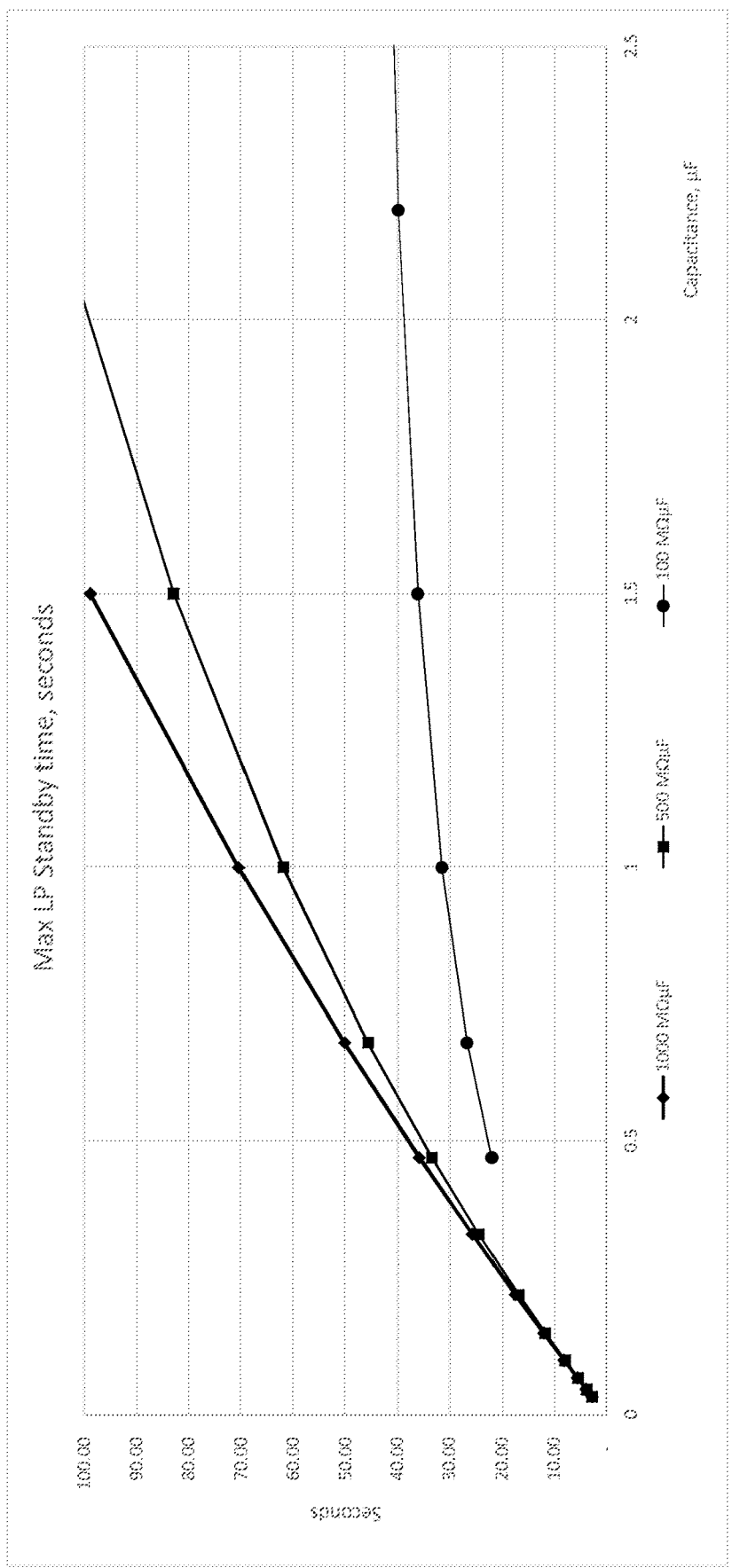
FIG. 12 is a waveform diagram of second example capacitor characteristics for maximum standby time, in accordance with embodiments of the present invention.

Referring now to FIGS. 11 and 12, shown are waveform diagrams of first and second example capacitor characteristics for maximum standby time, in accordance with embodiments of the present invention. In the LP standby mode, VX pump 702 can be disabled, and read cycles can begin prior to the VX pump restart operation. At the start of a read operation, the memory device can immediately begin reading by using supply currents from VX cap 802 and $V_{CC}$. Accordingly, VX cap 802 should hold enough charge to handle read operations for the amount of time needed to restart and stabilize VX pump 702. This time duration can be substantially equal to the DPD wake-up time (e.g., about 5 μs, and up to a maximum of about 8 μs). The amount of charge can be calculated as a fixed charge that equals the read current times the DPD wake-up time, with compensation for leakage current of the capacitor itself. This amount of charge loss can be dependent on the time spent in the LP standby mode, as well as the capacitor leakage over time as a function of its remaining voltage. Generally, the leakage current of a capacitor goes down as the voltage across the capacitor is reduced, and this can be modeled as a resistor in a first order approximation.

The leakage current of VX pad 802 and internal circuitry connected thereto is also a factor in the capacitance required to sufficiently maintain the voltage on the VX supply. The capacitance required depends on the charge required and the maximum allowable voltage drop. This voltage drop is the difference between the maximum VX voltage that VX pump 702 is allowed by the circuit to generate and the minimum input voltage (VX voltage) that LDO 218 can accept while still providing the required 5V output for the read circuitry. The capacitor leakage current (self-discharge) and pad leakage will be discussed in further detail below. About 75 μA may be required in a read operation per sense amplifiers, so for 128 sense amplifiers, the total VX current will then be 10.6 mA, and 3.4 mA for 32 sense amplifiers. For a maximum wake-up time of 8 μs, the charge can then be calculated as 84.8 nC for 128 sense amplifiers, and 27.2 nC for 32 sense amplifiers. The capacitance required may depend on the voltage drop allowed on the VX node. If a maximum VX voltage of 9.5V is utilized along with an LDO that can handle 5.5V, a 4V voltage drop can be determined, as shown below in Table 2.

TABLE 2

| | | Read Capacitance required (nF) | | | |
|---|---|---|---|---|---|
| # Sense | Read | Voltage drop (V) | | | |
| amps | Charge (nC) | 1 | 2 | 3 | 4 |
| 128 | 110.4 | 110.4 | 55.2 | 36.8 | 27.6 |
| 32 | 33.6 | 33.6 | 16.8 | 11.2 | 8.4 |

In this example, the actual capacitance needed for read operations is only slightly above 100 nF, even for the highest number of sense amplifiers and the lowest voltage drop. Additional capacitance may also be needed to account for the capacitor self-discharge and pad leakage. In another approach to get a longer standby time with smaller capacitors, the VX voltage can be allowed to go even higher, but this may add power in the recharge cycle and additional leakage while the capacitor voltage is at its highest.

In this particular example, the energy loss for the LP standby operation can be targeted as similar to that of the DPD mode (e.g., less than 1 μA @1.8, equivalent to 200 nA @9V). If the self-discharge current of the capacitor remains at half of that (or less), 100 nA @9, this can be modeled as a constant current drain or as a load impedance of 90 MΩ. Also, 6V may be needed to be left on the capacitor by the time the read operation starts, and 5.5V may be needed to remain by the time the read operation ends, whereby LDO 218 drops 500 mV or less. For example, for a 12 mA read current, and an 8 μs read time, the storage element or other circuitry may provide the current for the read operation before VX pump 702 is ready to take over. In this case, a required capacitance to supply the read current can be about 220 nF. A smaller capacitor can be used if a minimum voltage of more than 6V is estimated, down to about 27 nF, while a larger capacitance may be used to increase LP standby time.

Because electrolytic capacitors (e.g., tantalum electrolytic capacitors) have leakages starting at 0.25 μA at room temperature, these capacitors may not be suitable options for this application. Various plastic film capacitor types have excellent leakage properties, but may be too expensive for the suitable capacitance ranges, and also can be relatively large in area. However, such capacitors may have sub-nA leakage, and thus may be suitable for applications where minimum leakage current or very long standby times are desired without recharging the capacitor. Ceramic capacitors may provide the best trade-off for capacitance versus leakage current, cost, and physical size. Ceramic capacitors have generally reached high enough capacitance values in relatively small form factors to compete directly with electrolytic capacitors for capacitance within a given capacitor volume, while maintaining much lower leakage and lower cost in many cases.

Ceramic capacitors are often divided into 3 classes. Class I capacitors (e.g., COG [NP0]) may provide the best temperature coefficient and tolerance, while typically also providing the lowest leakage. However, these capacitors may also have the largest physical volume and the highest cost for a given capacitance and voltage. Class II capacitors may provide higher capacitance for a given volume and/or price. However, the leakage of this class of capacitor is higher, and the capacitance may vary more over both temperature and voltage. Class III capacitors may also not be suitable for the capacitance ranges and leakages as targeted herein.

Capacitance in ceramic capacitors is generally a function of the dielectric material used, the area of the plates, and the distance between the plates. Doubling the area or reducing the distance by half doubles the capacitance, but can also double the leakage current through the dielectric material. Increased voltage on the capacitor can increase leakage current and decrease discharge time by the same factor. For relatively small capacitance values, other leakage currents can become dominant. There is also an upper limit to how high the discharge resistance gets regardless of how small the capacitance gets, which can be in the 10-100GΩ range or higher for good ceramic capacitors (see, e.g., Kemet X5R and X7R devices, and Table 3 below).

TABLE 3

| Capacitor (µF) | Insulation resistance (MΩ) | | |
|---|---|---|---|
| | 1000 MΩµF | 500 MΩµF | 100 MΩµF |
| 0.1 | 10000 | 5000 | |
| 0.15 | 6667 | 3333 | |
| 0.22 | 4545 | 2273 | |
| 0.33 | 3030 | 1515 | |
| 0.47 | 2128 | 1064 | |
| 0.68 | 1471 | 735 | |
| 1 | 1000 | 500 | 100 |
| 1.5 | 667 | 333 | 67 |
| 2.2 | | 227 | 45 |
| 3.3 | | 152 | 30 |
| 4.7 | | 106 | 21 |
| 6.8 | | 74 | 15 |
| 10 | | 50 | 10 |

In this example, the minimum required VX cap value is calculated from 6V VX, 0.5V drop, 12 mA read current, and 8 µs read time, which gives a required capacitance to supply the read current of 192 nF. By comparing the insulation resistance in the table above against the 80MΩ leakage resistance, it can be seen that 1000MΩµF is too much for almost any capacitance value, and the mid-range of the 500MΩµF caps appears more desirable. For 100MΩµF, the leakage in the capacitor may dominate except for the lowest values. For example, the maximum LP standby time can be calculated from a 9.5V VX level, a 3.5V drop, and an 80MΩ load, which may indicate the time until there 6V remains on capacitor 802. A smaller capacitance using a better material may provide a longer max LP standby time than the larger capacitances using materials with higher leakage/lower resistance. For example, 500MΩµF caps can achieve standby times of up to a minute or more if a physically large capacitor is used. A small capacitor example, such as <1.0 µF, may provide 20-40 seconds of LP standby time, while offering cost savings. 100MΩµF caps can achieve much shorter standby times, even for large values, and may only be useful for certain applications.

At system wake-up (e.g., power-on or wake-up from a true sleep mode), VX capacitor 802 may be discharged. In this case, a normal wake-up time, as well as $V_{CC}$ inrush current, may be required, and the VX capacitor can be recharged. This adds to the wake-up time, or the time before the LP standby mode can again be used. Here, a regular standby mode, with VX pump 702 running, can still be used until the VX cap is recharged. In this approach, internal circuitry (e.g., power transistors/switches) can be used to prevent the discharged VX cap from dragging down the internal VX voltage.

In some cases, the wake-up time may remain unchanged by charging VX cap 802 in parallel to the wake-up, but this approach may require a larger VX pump, or a VX pump with an additional charging capacitor for the situation. If the user decides to add a larger capacitor than the pump was designed for, the wake-up time can also be increased as a result. When LP standby mode is used, the need for frequent wake-up from DPD sleep mode can accordingly be reduced, as similar system behavior may be achieved without issuing the DPD command. The DPD sleep mode can still be used in this case, or the UDPD sleep mode could be utilized. The time for a full recharge of VX cap 802 can be calculated as shown in the following example. If VX pump 702 is designed to output 12 mA, and a 500 nF cap is used, a recharge from 0V to 9V may require 4500 nC, and the additional recharge time can be about 375 µs, which is over 5× the normal wake-up time (e.g., 70 µs). Accordingly, normal read operations should resume prior to waiting for the VX cap to be fully recharged. However, the example here shows that a larger VX pump may not be needed, and instead a normal size pump can be sufficient.

In many systems, the host device can run a timer interrupt that issues a dummy read to the memory device after a predetermined time has elapsed in cases whereby the memory device has otherwise not been accessed. To the extent that the capacitor chosen provides enough time for most standby operations, the energy consumed by the occasional dummy read may have little impact on the overall low energy consumption. However, in an XiP scenario, the host controllers may not have features to automatically issue dummy reads or to reset a timer. In another example, a host device can include timer and a timer input pin for XiP operation. In this case, one of the host device's timers can trigger the required dummy read. If the timer is configured as a one-shot circuit and tied to the SPI's CS, CS=0 can clear the one-shot, while CS=1 can start the counting. If CS=1 for a long enough time (e.g., timer reaching its pre-set timeout value), the timer can issue an interrupt to the host device, which may issue a dummy read operation to the memory device in response. The energy consumption for running the timer in each of these cases can be less than 1 µA, or at least less than a normal standby current consumption. As another example, instead of a dummy read operation, the host device may issue the exit DPD command.

In another example, a timer in the memory device can monitor the LP standby time, and start VX pump 702 if the device remains in this standby mode for too long. In this case, a timer can remain running at all times while in the LP standby mode. The power consumption of this timer should be less than 1 µA (from $V_{CC}$), but such a timer may not need to be highly accurate, and thus can be designed in order to minimize power consumption. Starting VX pump 702 a bit too early is thus not a big issue, and only a late start may be problematic. The timer can also be temperature dependent, running faster at higher temperature when leakage current is higher, and may be programmable in order to allow customers to decide the size of the capacitor versus the maximum LP standby time before the timer starts. The memory device can also monitor the VX voltage and start VX pump 702 if the output voltage gets too low, which may utilize a programmable voltage monitor. The cut-off voltage can depend on the capacitor, so the voltage limit may be set accordingly. An alternative is a fixed voltage monitor that is based on a minimum capacitance value required. In this case, a larger capacitor may still provide a longer LP standby time, but the additional capacitance may not be fully utilized. The voltage monitor can remain running at all times while in LP standby mode, and the power consumption of this voltage monitor should be less than about 1 μA (from $V_{CC}$).

While the above examples include circuit, operational, and structural implementations of certain memory arrangements and devices, one skilled in the art will recognize that other technologies and/or architectures, as well as other modes of operation, can be used in accordance with embodiments. Further, one skilled in the art will recognize that other device circuit arrangements, architectures, elements, and the like, may also be used in accordance with embodiments. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A memory device, comprising:
   a) a control circuit configured to operate the memory device in one of an active mode, a standby mode, and a sleep mode, wherein the memory device is configured to receive a command from a host device when in the standby mode;
   b) a voltage regulator having an output that provides a supply voltage for accessing contents of memory cells in the memory device, wherein the voltage regulator is off during the sleep mode and the standby mode, and the voltage regulator is on during the active mode; and
   c) a capacitor configured to maintain the supply voltage to allow the voltage regulator to be turned off during the standby mode, and at least until the voltage regulator turns on in the active mode and supports the supply voltage,
   wherein the capacitor is connected to an output of the voltage regulator which charges the capacitor to hold charge to supply the memory device during start of read operations and until the voltage regulator is able to supply voltage after being enabled during a wake-up time from a deep power down (DPD) sleep mode, wherein during the standby mode, the voltage regulator is turned off,
   wherein the capacitor is recharged in response to entering the active mode and which further stores energy to supply a read circuitry with needed power to start the read operations after receiving a read command and transitioning from the standby mode to the active mode, and for a time period it takes to restart the voltage regulator, and
   wherein a host device, which runs a timer interrupt, issues a dummy read to the memory device after a predetermined time has elapsed to restart the timer in the case that memory device has otherwise not been accessed to enter the active mode, whereby providing the capacitor with sufficient charge during the standby mode;
   wherein in the active mode, the memory device controls the voltage regulator to be running until the capacitor is recharged to support a low power in the standby mode, and
   the sleep mode comprises the DPD sleep mode and an ultra-deep power down (UDPD) sleep mode, in the UDPD sleep mode and the DPD sleep mode, output of the voltage regulator, along with voltage generation circuitry, are disabled and in the UDPD sleep mode, all components that are powered by a VDD voltage supply are completely powered down, and for both the DPD and UDPD sleep modes,
   wherein in the active mode the memory device controls the voltage regulator to be running-until the capacitor is recharged to support a low power in the standby mode, and
   the sleep mode comprises a deep power down (DPD) sleep mode and an ultra-deep power down (UDPD) sleep mode, in the UDPD sleep mode and the DPD sleep mode, output of the voltage regulator, along with voltage generation circuitry, are disabled and in the UDPD sleep mode, all components that are powered by a VDD voltage supply are completely powered down, and for both the DPD and UDPD sleep modes, a wake-up time signal from a wake-up circuit is provided before returning to the standby mode or receiving power to the components and to accept commands.

2. The memory device of claim 1, wherein the output of the voltage regulator is coupled to an external pin of the memory device and can be left unused during the read operations.

3. The memory device of claim 2, wherein the capacitor is coupled to the external pin and a ground and is configured to compensate for energy loss from the capacitor while in the standby mode.

4. The memory device of claim 3, wherein the capacitor is integrated within a package of the memory device.

5. The memory device of claim 3, wherein the capacitor is external to a package of the memory device, and enough energy is stored in the capacitor to supply a read circuitry current for a time required to restart the voltage regulator and to compensate for energy loss of the capacitor during the standby mode.

6. The memory device of claim 1, wherein in the UDPD sleep mode, all components that are powered by VDD voltage supply are completely powered down such that the UDPD sleep mode allows the memory device to consume less power as compared to the standby mode.

7. The memory device of claim 6, wherein the voltage regulator comprises a charge pump, and the voltage regulator is off during the DPD sleep mode and the standby mode, and the voltage regulator is on during the active mode.

8. The memory device of claim 1, further comprising an external regulator configured to provide the supply voltage at the external pin.

9. The memory device of claim 1, wherein the voltage regulator is enabled in response to entering the active mode from the standby mode, and in boot-up applications, the memory device can be read once at power up, and a remaining time spend in the DPD sleep mode or the UDPD sleep mode.

10. The memory device of claim 9, wherein the voltage regulator is configured to support the supply voltage a predetermined time after being enabled after entering the active mode, and during the standby mode, the supply voltage is gradually lower due to capacitor discharging without being resupplied by the voltage regulator, and the memory device enters the read operations plus a recharge mode, whereby the voltage regulator brings the supply voltage back to its full level.

11. A method of controlling a memory device, the method comprising:
  a) operating, by a control circuit, the memory device in one of an active mode, a standby mode, and a first sleep mode, and a second sleep mode, the first sleep mode is a deep power down (DPD) sleep mode and the second sleep mode is a ultra-deep power down (UDPD) sleep mode, wherein the memory device is configured to receive a command from a host device when in the standby mode;
  b) providing, at an output from a voltage regulator, a supply voltage for accessing contents of memory cells in the memory device, wherein the voltage regulator is off during the sleep mode and the standby mode, and the voltage regulator is on during the active mode; and
  c) maintaining, by a capacitor, the supply voltage to allow the voltage regulator to be turned off during the standby mode, and at least until the voltage regulator turns on in the active mode and supports the supply voltage,
  wherein the capacitor is connected to an output of the voltage regulator which charges the capacitor to hold charge to supply the memory device during start of read operations and until the voltage regulator is able to supply voltage after being enabled during a wake-up time from the DPD sleep mode, wherein during the standby mode, the voltage regulator is turned off,
  the capacitor is recharged in response to entering the active mode,
  the capacitor stories energy to supply a read circuitry with needed power to start the read operations after receiving a read command and transitioning from the standby mode to the active mode, and
  wherein a host device, which runs a timer interrupt, issues a dummy read to the memory device after a predetermined time has elapsed to restart the timer in the case that memory device has otherwise not been accessed to enter the active mode, whereby providing the capacitor with sufficient charge during the standby mode;
  the capacitor stores energy to supply to the read circuitry for a time period it takes to restart the voltage during the wake-up time from the DPD sleep mode, and
  in the UDPD sleep mode and the DPD sleep mode output of the voltage regulator, along with voltage generation circuitry therein, are disabled and in the UDPD sleep mode, all components that are powered by VDD voltage supply are completely powered down such that the UDPD sleep mode allows the memory device to consume less power as compared to the standby mode, and
  for both the DPD and UDPD sleep modes, a wake-up time signal from a wake-up circuit is provided before returning to the standby mode or receiving power to the components and to accept commands.

12. The method of claim 11, wherein the output of the voltage regulator is coupled to an external pin of the memory device, and which connects to the capacitor.

13. The method of claim 12, wherein the capacitor that is coupled to the external pin and a ground.

14. The method of claim 13, wherein the capacitor is integrated within a package of the memory device.

15. The method of claim 13, wherein the capacitor is external to a package of the memory device.

16. The method of claim 11, wherein the voltage regulator comprises a charge pump.

17. The method of claim 11, wherein utilization of the sleep mode is disabled by the host device and in boot-up applications, the memory device can be read once at power up, and a remaining time spend in the DPD sleep mode or the UDPD sleep mode.

18. The method of claim 11, further comprising using an external regulator to provide the supply voltage at the external pin.

19. The method of claim 11, further comprising enabling the voltage regulator in response to entering the active mode from the standby mode.

20. The method of claim 19, wherein the voltage regulator is configured to support the supply voltage a predetermined time after being enabled after entering the active mode.

* * * * *